Jan. 21, 1958     C. L. FABIAN     2,820,296
TEMPERATURE COMPENSATING ATTACHMENT FOR LINEAL MEASURES
Filed May 31, 1956
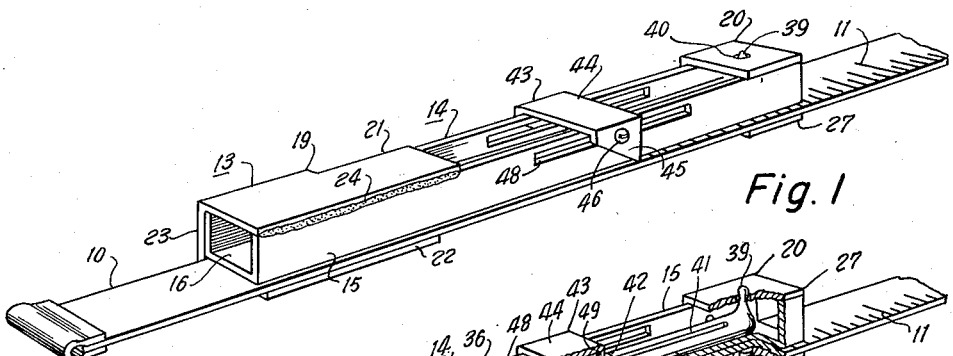
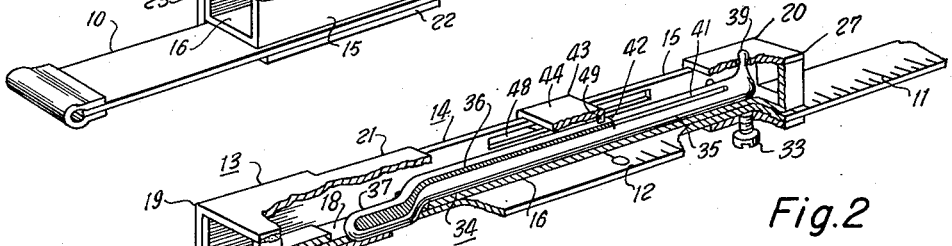
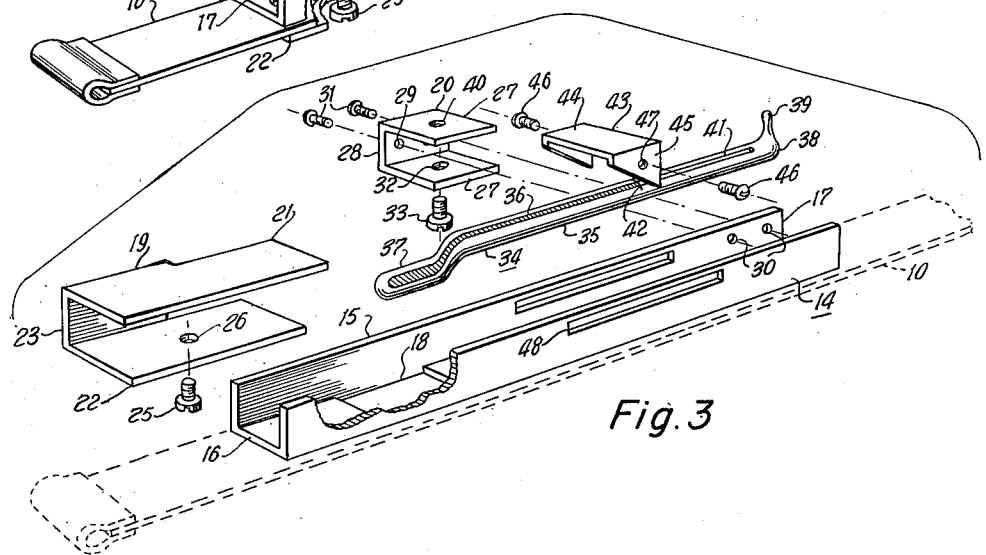
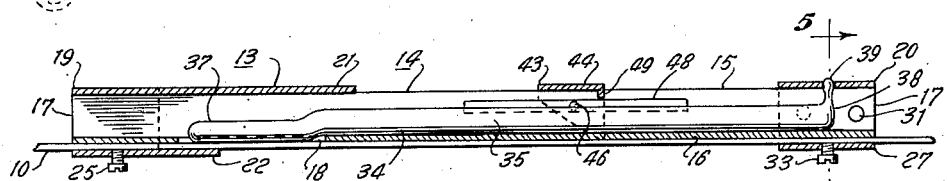
INVENTOR
Clifford L. Fabian
BY *Ashley & Ashley*
ATTORNEYS

2,820,296

TEMPERATURE COMPENSATING ATTACHMENT FOR LINEAL MEASURES

Clifford L. Fabian, McAllen, Tex.

Application May 31, 1956, Serial No. 588,434

9 Claims. (Cl. 33—137)

This invention relates to new and useful improvements in temperature compensating attachments for lineal measures.

One object of the invention is to provide an improved temperature compensating attachment which is of such construction as to be capable of being readily mounted on a tape, rod or other lineal measure subject to thermal linear expansion and contraction in such manner that a direct reading of the correct measurement is obtained without the necessity of calculations or adjustments.

An important object of the invention is to provide an improved temperature compensating device for metal tapes and similar lineal measures which includes an integral tube and bulb or reservoir, similar to a common thermometer, in which the liquid, together with the tube and reservoir, is proportioned in accordance with the length and coefficient of expansion of the tape whereby variations in said length, resulting from changes in temperature, will be shown by the end of the liquid column.

A particular object of the invention is to provide an improved temperature compensating attachment, of the character described, wherein the thermometer means is arranged to be mounted on the tape with its reservoir in heat exchange relation to said tape and its liquid column extending longitudinally along said tape and toward its opposite end, the liquid column having its end coinciding with the terminal mark of said tape when said tape is at its standard temperature, being that temperature at which the tape is at its correct length, whereby said liquid column end advances or recedes as the temperature of the tape varies and whereby said liquid column end is always at a constant distance from the opposite end of the tape, thus giving the correct measurement.

Another object of the invention is to provide an improved temperature compensating attachment, of the character described, which includes a housing for supporting the thermometer means and clamp means for fastening the housing to the tape or other measure with the bulb of said thermometer means in engagement with said tape whereby the attachment may be accurately positioned and detachably connected to said tape.

A further object of the invention is to provide an improved temperature compensating attachment, of the character described, which is capable of being mounted on both ends of a tape or other lineal measure by proportioning the thermometers in accordance with one-half the length of the tape.

A construction designed to carry out the invention will be hereinafter described, together with other features of the invention.

The invention will be more readily understood from a reading of the following specification and by reference to the accompanying drawing, wherein an example of the invention is shown, and wherein:

Fig. 1 is a perspective view of a temperature compensating attachment constructed in accordance with the invention and mounted on a metal tape, Fig. 2 is a view similar to Fig. 1 and partly in section, Fig. 3 is an exploded perspective view of the attachment, Fig. 4 is a longitudinal, sectional view of the attachment mounted on the tape, and Fig. 5 is a transverse, vertical, sectional view, taken on the line 5—5 of Fig. 4.

In the drawing, the numeral 10 designates one end of a tape or other lineal measure of metal or other material subject to thermal expansion and contraction and having the usual graduations 11. As shown by the numeral 12 in Fig. 2, the zero graduation or terminal indicia is spaced from the extremity of the tape. In order to compensate for variations in the length of the tape due to thermal expansion and contraction, a temperature compensating attachment or device 13 is adapted to be mounted on one or both ends of said tape in overlying relation to the terminal indicia 12. Although the attachment is designed for use on a metal tape, it is noted that the same could be applied to a metal rod or other lineal measure.

The attachment 13 includes an elongated, substantially rectangular casing or housing 14 which is of channel or U-shape in cross-section and which includes longitudinal side walls 15 and a coextensive bottom wall 16. As shown by the numeral 17, the ends of the casing are open, an elongated opening or slot 18 being formed in the bottom wall 16 adjacent the outer open end 17 and extending to each side wall 15. Substantially C-shaped clamp or mounting members 19 and 20 are fastened to the end portions of the channel-shaped casing 14 for connecting the attachment to the tape.

As shown most clearly in Fig. 3, the outer mounting member 19 includes upper and lower, parallel flanges 21 and 22 connected at one end by a web 23 of reduced length. The web 23 is of greater height than the side walls 15 so that the outer end of the casing 14 may be engaged in the member 19 with the upper flange 21 overlying the open top of said casing and the lower flange 22 underlying the bottom wall 16. In fact, the web 23 is of sufficient height to accommodate the tape between the bottom wall and lower flange. As shown by the numeral 24, the outer, longitudinal margin of the upper flange is welded or otherwise premanently secured to the underlying side walls 15. A set screw 25 is screw-threaded through the lower flange for clamping engagement with the tape. It is noted that the lower flange 22 is of sufficient length to underlie a portion of the opening 18, while the upper flange 21 extends beyond and completely overlies said opening (Fig. 4).

The outer mounting member 20 includes upper and lower, parallel flanges 27 and a coextensive web 28 which is similar to the web 23. For detachably connecting the member 20 to the inner end of the casing in surrounding relationship, a pair of openings 29 are formed in the web 28 for registration with screw-threaded openings 30 formed in one of the side walls 15 and engagement by suitable screws 31. The lower flange 27 is spaced from the bottom wall 16 to accommodate the tape therebetween and has a screw-threaded opening 32 for receiving a set screw 33, similar to the set screw 25. Due to the set screws, it is readily apparent that the casing 14 may be readily attached to the tape in adjusted positions.

The casing is adapted to support thermometer means 34 in heat exchange relation to the tape to compensate for thermal linear expansion and contraction of said tape. The thermometer means 34 is of conventional construction, being similar to and hereinafter referred to as a thermometer, and includes a tube 35 containing a column 36 of mercury or other suitable liquid and communicating with an integral, enlarged or offset bulb or reservoir 37 at one end thereof. As shown by the numeral 38, the opposite end of the tube 35 is closed or sealed in the usual manner and preferably has a lateral projection 39 for engagement in an opening 40 formed in the upper flange 27 of the mounting member 20 (Fig. 5). The bulb 37 is adapted to engage the tape through the opening 18 and is enlarged or offset sufficiently to accomplish this purpose. The thermometer, its tube 35 and liquid column 36 extend longitudinally of the casing and tape from the end 10 of said tape toward its opposite end and is held against displacement by the engagement of its projection 39 in the opening 40 and by the upper flange 21 of the mounting member 19 overlying the bulb 37 of said thermometer as well as the adjacent portion of said tube.

The thermometer is proportioned in accordance with the length and coefficient of expansion of the tape so as to compensate for thermal expansion and contraction of said tape. This is accomplished by the tube 35 having a bore 41 of such diameter and a reservoir 37 of such capacity that the expansion and contraction of the liquid causes the end of the liquid column to advance or recede a distance equal to the expansion or contraction of the tape and in the opposite direction. As shown in Figs. 2 and 3, a mark 42 is scribed on the tube and is adapted to be alined with the terminal mark 12 of the tape when the attachment is mounted thereon. The mark 42 must be scribed on the tube 35 at the end of the liquid column 36 when the temperature of the thermometer is at the standard temperature of the tape to which it is to be attached, the standard temperature of the tape being that temperature at which the tape is of correct length. At standard tape temperature, therefore, the terminal mark 12 of the tape, the end of the liquid column 36 and the mark 42 are in alinement and coincide one with the other. As the temperature varies, the end of the liquid column 36 advances or recedes relative to the mark 42 and any variation in the length of the tape, due to thermal expansion or contraction, is represented by the distance between the end of the liquid column 36 and the mark 42. Since the liquid expands and contracts in accordance with the expansion and contraction of the tape, the end of the liquid column moves in a direction opposite to the lengthening or shortening of the tape and an equal distance whereby the distance between said liquid column end and the opposite end of said tape remains constant and provides the correct measurement without the necessity of calculations or adjustments.

Of course, if the distance measured is less than the length of the tape, it is necessary to make a simple mental calculation. If desired, the temperature compensating attachment 13 may be mounted on each end of the tape. In this event, each thermometer would be designed to compensate for one-half the total variation in length of the tape and would be mounted in the same manner with the liquid column extending inwardly from each end of said tape toward its opposite end.

If desired, an indicator 43 may be mounted on the casing in order to reduce error of reading due to parallax. The indicator includes a top plate 44 overlying the open top of the casing between the mounting members 19 and 20 and having a pair of depending, lateral flanges 45 overlying the side walls 15. Suitable screws 46 are carried by screw-threaded openings 47 in the flanges 45 for engagement in elongated openings or slots 48 extending longitudinally of the side walls whereby the indicator 43 is slidably mounted for adjustment longitudinally of the casing. Since an error due to parallax is possible because of the difference of elevation between the liquid column and the tape, a depending flange or pointer 49 is carried by one end of the indicator for alinement with the end of the liquid column 36 whereby the position of said end may be readily and accurately determined. It is noted that the mounting of the thermometer 34 permits replacement of the same in the event of breakage, although it may be desirable or necessary to cement the projection 39 in the opening 40.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A temperature compensating device for a lineal measure subject to thermal expansion and contraction including thermometer means proportioned in accordance with the length of the lineal measure and its coefficient of expansion and including a tube sealed at one end with a reservoir at its opposite end, and means for mounting the thermometer means on one end of the measure with its reservoir in heat exchange relation to the measure and with its tube extending longitudinally of the measure and toward its opposite end, said thermometer means having a liquid column in its tube with the end of the column coinciding with the terminal indicia of the measure at a predetermined standard temperature whereby said liquid column end remains a constant distance from the opposite end of the measure and indicates the correct measurement.

2. A temperature compensating device as set forth in claim 1 wherein the mounting means includes a casing for supporting the thermometer means with its reservoir in engagement with the lineal measure, and means for fastening the casing to the measure.

3. A temperature compensating device as set forth in claim 1 wherein the mounting means includes an elongated housing having an opening for receiving the reservoir of the thermometer means, and means for fastening the housing to the measure with said thermometer reservoir in contact with the measure.

4. A temperature compensating attachment for a metal tape or other lineal measure subject to thermal linear expansion and contraction including a thermometer proportioned in accordance with the length of the tape and its coefficient of expansion and including a tube containing a liquid column and having a bulb at one end and sealed at its opposite end, an elongated casing overlying one end of the tape and having a bottom opening exposing a portion of the tape, the thermometer being mounted in the casing with its tube extending longitudinally of the tape and toward its opposite end and with its bulb engaging the tape through the bottom opening, the end of the liquid column coinciding with the terminal indicia of the tape whereby, as its temperature varies, said liquid column end moves a distance equal to the thermal expansion or contraction of the tape and in the opposite direction to indicate the correct measurement.

5. A temperature compensating attachment as set forth in claim 4 wherein the casing is open ended and has a top opening permitting observation of the end of the liquid column.

6. A temperature compensating attachment as set forth in claim 4 wherein the casing includes longitudinal side walls and a top opening through which the end of the liquid column is visible, and an indicator slidably supported by the side walls in overlying relation to the top opening for alinement with said column end.

7. A temperature compensating attachment as set forth in claim 4 wherein the thermometer tube has a bore of such diameter and a reservoir of such capacity that the lineal movement of the end of the liquid column in said tube will be proportionate to the expansion and contraction of the tape.

8. A temperature compensating attachment for a lineal measure or tape subject to thermal expansion and contraction including an integral tube and bulb similar to a common thermometer in which the liquid together with the tube and reservoir is proportioned in accordance with the length and coefficient of expansion of the tape, and means for mounting the tube and bulb on the tape with its reservoir in heat exchange relation to the tape, the tube being marked at the end of the liquid column at the standard temperature of the tape, whereby as the temperature varies, the end of the liquid column advances and recedes relative to the mark, the distance between the mark and the end of the liquid column being equal to the expansion or contraction of the tape.

9. A temperature compensating attachment for a lineal measure or tape subject to thermal expansion and contraction including an integral tube and bulb similar to a common thermometer in which the liquid is proportioned in accordance with the length and coefficient of expansion of the lineal measure or tape, and means for mounting the thermometer tube on one end of the tape with its bulb in heat exchange relation to the tape and with its tube and liquid column extending longitudinally of the measure and toward its opposite end, the liquid column having its end coinciding with the terminal mark of the lineal measure when the measure and the thermometer are at standard temperature of said measure, the standard temperature of the measure being that temperature at which the measure is at its correct length, whereby the end of the liquid column advances and recedes as the temperature of the tape varies so as to remain at a constant distance from the opposite end of the tape for indicating the correct length of the tape.

References Cited in the file of this patent

UNITED STATES PATENTS

| 1,453,488 | Andrews | May 1, 1923 |

FOREIGN PATENTS

| 704,095 | Germany | Mar. 22, 1944 |
| 838,220 | Germany | June 30, 1952 |